A. VREELAND.
Cart-Loading Scoops.
No. 155,845. Patented Oct. 13, 1874.
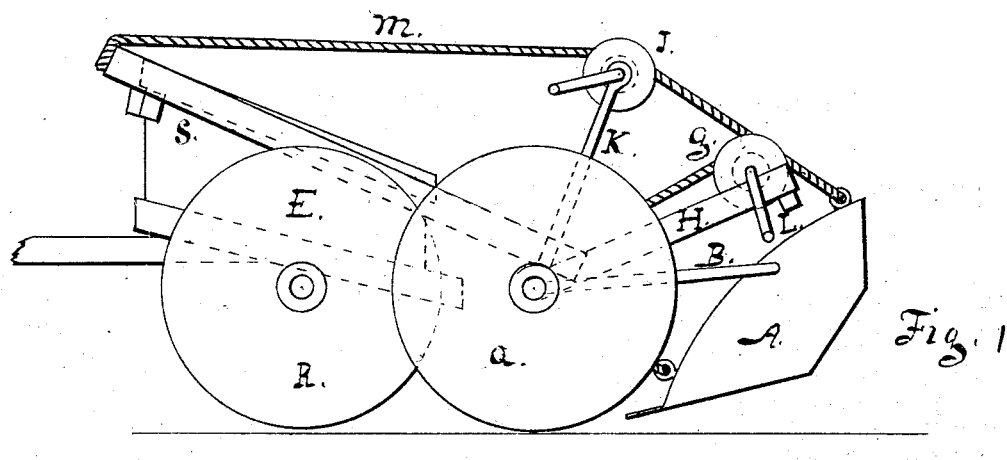
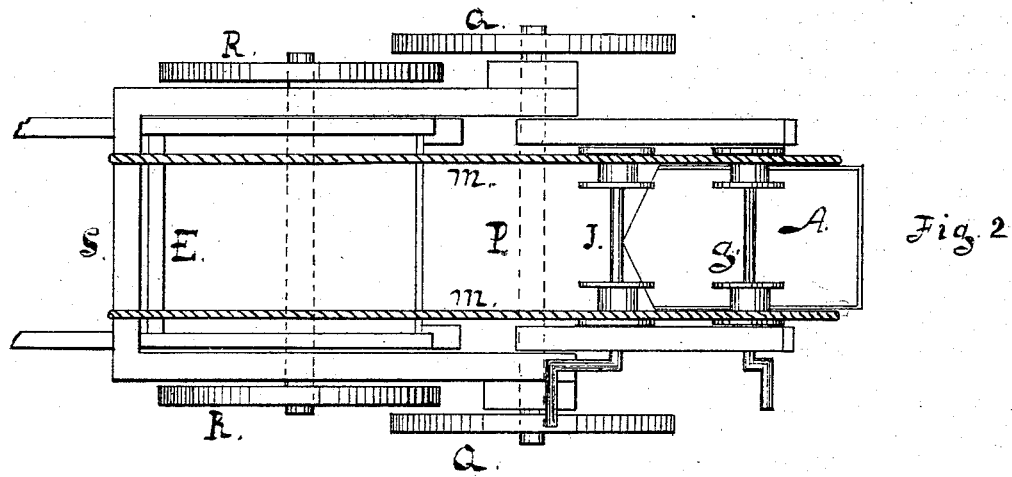
Witness
Horace Harris
Chas. P. Ross
Inventor
Aaron Vreeland

UNITED STATES PATENT OFFICE.

AARON VREELAND, OF MONT CLAIR, NEW JERSEY.

IMPROVEMENT IN CART-LOADING SCOOPS.

Specification forming part of Letters Patent No. 155,845, dated October 13, 1874; application filed February 12, 1874.

*To all whom it may concern:*

Be it known that I, AARON VREELAND, of Mont Clair, in the county of Essex and State of New Jersey, have invented an Improved Cart-Loading Scoop, of which the following is a specification:

By reference to my patent of December 9, 1873, it will be seen that the scoop A and swing-windlasses $g$ and $j$ and their supports H and K are hung to the joint-pin $c$, connected with the rear end of the cart E.

My present improvement consists, first, in hanging all these several parts to an axle, P, on which are the wheels Q. These wheels are spread apart on a long axle, so that in use they will come outside of the wheels of the cart R. (See Fig. 2.) The party in operating the windlass J will, from the rear, step upon this axle, and thus the more effectually operate the scoop in the process of emptying it; and the wheels and axle become a separate carriage for the transportation of the scoop when not connected with a cart. The second part of my improvement consists in the mode of attaching the scoop and its appliances to the cart, which is by the frame S connected with the axle P. When the scoop and cart are to be connected the front end of the frame is raised, and the cart is backed up nearly to the axle P, when the frame is let down along by the outside of the cart-box until the front end drops over the front end of the cart, and thus the wheels and scoop are drawn along. With this arrangement the chain or rope $m$ in passing from the windlass $j$ is secured to the frame S at the front end.

Other modes of attaching the axle and dependencies to the cart may be naturally suggested.

When the cart is loaded the frame is raised, and the cart is drawn away for unloading.

I claim—

1. The combination of the scoop A and swing-windlasses $g$ and $j$, supports H and K, and rods B, and ropes $m$, connected with the axle P, substantially as and for the purposes set forth.

2. The axle P, with which is connected the scoop A and swing-windlasses $g$ and $j$, attached to the body of the cart E by means of the frame S, substantially as shown, and for the purpose specified.

AARON VREELAND.

Witnesses:
HORACE HARRIS,
CHAS. P. ROSS.